Patented Mar. 8, 1938

2,110,573

UNITED STATES PATENT OFFICE 2,110,573

TREATMENT OF ALUMINA-MAGNESIA-CHROMITE ORE

Albert E. Greene, Medina, Wash.

No Drawing. Application June 8, 1936, Serial No. 84,240. In Canada September 7, 1932

4 Claims. (Cl. 75—11)

My present invention relates to a metallurgical process for the treatment of chromite ore containing substantial quantities of alumina and magnesia.

Chromite ($Cr_2O_3$.FeO) has a theoretical composition of 68 percent of chromium sesquioxide ($Cr_2O_3$) and 32 percent of ferrous oxide (FeO), but in the mineral as found in nature, some of the iron has been usually replaced by varying amounts of magnesium, and some of the chromium by aluminum. The usability of chromite has heretofore usually been determined by the ratio between the iron and the chromium in the ore, and also the proportions of alumina and magnesia to the chromite. Iron increases the fusibility of the chromite and also gives a lower ratio of chromium to chromium plus iron in the ferro chrome made from the lower chromium-higher iron mineral. As the proportion of total alumina plus magnesia increases and as the chromium sesquioxide drops below 40 percent, the ore has been considered of much less value especially as the iron content increases. The ores most generally used for the manufacture of refractories contain from 38 to 48 percent of chromium sesquioxide, 12 to 24 percent of alumina, 14 to 18 percent of magnesia, (26 to 42 percent of combined alumina and magnesia) and preferably less than one third as much iron as chromium sesquioxide.

There are large deposits of mineral containing about 30 percent chromium sesquioxide ($Cr_2O_3$), 14 percent FeO, 32 percent alumina and 14 percent magnesia (46 percent total alumina plus magnesia) and less than 5 percent silica. This mineral has not been considered commercially usable either as refractory or as a suitable ore for the manufacture of ferro chrome.

The purpose of my present invention is the treatment of such mineral as just above described containing substantial percentages of alumina and magnesia and substantial amounts of chromium, in order to recover the chromium as an alloy with iron and to recover the alumina-magnesia material unadulterated as a refractory.

My present invention is based on the discovery that such a mineral as I have just specified, containing, for example, about 20% of chromium (Cr) 10% of iron (Fe), and some 45 to 50 percent of total alumina plus magnesia, can be treated so as to reduce the chromium and iron and even the silicon, while leaving the alumina-magnesia portion unadulterated and in improved condition for use as a refractory material.

I also discovered that when I treated this mineral or similar mineral to reduce the chromium and iron and flux the alumina-magnesia, the refractory value of the latter was lost. And I discovered that in order to obtain the alumina-magnesia material in condition to have a high melting point, it was necessary for me to use reducing agents which did not add any adulterating substance or agent, such as the ash in coke, which would lower the fusion or melting temperature of the alumina-magnesia material.

My present invention consists in the treatment of the mineral containing the chromium and iron and the alumina-magnesia, with a reducing agent, such as creosote carbon which will not add adulterating or fluxing agents to the portion to be recovered as refractory, and then subjecting the charge to electric heat to reduce the chromium and iron and to fuse the alloy thus reduced and also the refractory material, and finally cooling the mass and separating the ferro chromium or the iron chromium alloy from the alumina-magnesia. In carrying out this invention I prefer to use a simple form of electric arc furnace having a top electrode and bottom connection thru the hearth of the furnace or having two top adjustable electrodes, and then, with such a furnace, I charge a mixture of the mineral together with sufficient suitable carbonaceous reducing materials, such as creosote carbon, in about the necessary proportion to reduce all of the more easily reducible ferrous metals,—the chromium and iron, and, when desired the silicon, without reducing the alumina-magnesia. Thus for example, I charge the mineral, preferably ground to less than 20 mesh together with an excess of carbon over that required to reduce all the chromium, iron and silicon oxides, into a chamber into which two electrodes hang so that the electrodes can arc to the charge and reduce the metals chromium and iron and fuse the remaining alumina-magnesia. I prefer to add the charge in suitably small batches to accomplish this reduction and fusion and then add more charge on top of the already treated material until the furnace chamber is sufficiently filled with treated material. Then I allow the charge to cool below solidification temperature of metal and refractory material and remove it from the furnace and separate the metal and alumina-magnesia.

I may modify the procedure in various ways without getting away from the essential factors and steps of my invention. Thus, after I have accomplished the fusion of the reduced iron-chromium alloy metal and the alumina-magnesia, it is understood that I do not limit myself as to the particular method of cooling and separation of the products. Thus the particular place of cooling the reduced metal and alumina-magnesia products is not a limiting feature of my invention. I may add iron in suitable form to the charge, either as sponge iron, or steel scrap or oxide so as to collect the chromium in a higher iron and lower chromium alloy; and I may reduce the silicon likewise.

I may use any suitable shell lined with refractory material or even carbon for carrying out the reduction and fusion.

What I do, however, is to avoid any adulteration of the alumina-magnesia from any reducing material put in the charge, for in this way I am able to obtain a high melting point refractory.

This application is filed as a continuation in part of my application Serial No. 643,007 filed originally November 17, 1932 for any subject matter disclosed therein and claimed herein.

What I claim is:

1. The method of treating chromite containing substantial percentages of alumina and magnesia, to separate the latter in substantially pure and adulterated condition and to recover the chromium as an iron alloy, said method consisting in preparing a charge of the ground chromite-alumina-magnesia material together with carbonaceous reducing agent in sufficient amount to reduce substantially all of the chromium and iron oxides present, said carbonaceous material being substantially free from any agent which would materially lower the melting point of the unreduced remaining alumina-magnesia; then reducing this charge in an arc chamber and causing fusion of the reduced metal and of the alumina-magnesia by means of the arc heat; then cooling the charge and separating the metal and alumina-magnesia products from one another.

2. The method of treating chromite ore containing substantial percentages of alumina and magnesia, said method consisting in preparing a charge of the chromite ore together with iron in either metallic or oxide form and also carbonaceous reducing agent such as creosote carbon substantially free from fluxing agents which would lower the melting point of any separated alumina-magnesia, and then reducing this charge with the electric arc, fusing the reduced metal and also the alumina-magnesia and after cooling the charge, separating the metal from the refractory material.

3. The method of treating alumina-magnesia-chromite ore which method consists in preparing charge of said ore and a carbonaceous reducing agent and subjecting this charge in an electric furnace to reducing action sufficient to reduce the oxides of chromium and iron and also of silicon so as to leave unreduced the alumina-magnesia material in substantially unadulterated condition, and subsequently separating the metal and the refractory material from each other.

4. The method of treating alumina-magnesia-chromite ore which consists in preparing a charge of such ore and carbonaceous reducing agent, the latter in sufficient proportion to reduce substantially all of the chromium and iron and silicon oxides present in the charge, subjecting the charge to electric heat sufficient to cause reduction of said metals and to cause fusion of the reduced chromium-iron alloy leaving the alumina-magnesia refractory material unreduced and substantially free from objectionable adulterating compounds which would materially lower its melting temperature, and subsequently separating the reduced metal and the refractory material thus produced from each other.

ALBERT E. GREENE.